United States Patent
Prud'homme Lacroix et al.

(10) Patent No.: US 11,433,992 B2
(45) Date of Patent: Sep. 6, 2022

(54) ROTORCRAFT HAVING AT LEAST ONE UNDERCARRIAGE WITH AT LEAST ONE INCLINED WHEEL, AND A METHOD

(71) Applicant: AIRBUS HELICOPTERS, Marignane (FR)

(72) Inventors: Pierre Prud'homme Lacroix, Vitrolles (FR); Olivier Bistuer, La Fares les Oliviers (FR)

(73) Assignee: AIRBUS HELICOPTERS, Marignane (FR)

( * ) Notice: Subject to any disclaimer, the term of this patent is extended or adjusted under 35 U.S.C. 154(b) by 731 days.

(21) Appl. No.: 16/037,198

(22) Filed: Jul. 17, 2018

(65) Prior Publication Data

US 2019/0023380 A1   Jan. 24, 2019

(30) Foreign Application Priority Data

Jul. 18, 2017   (FR) ........................................ 1770743

(51) Int. Cl.
| | |
|---|---|
| *B64C 25/10* | (2006.01) |
| *B64C 25/34* | (2006.01) |
| *B64C 25/36* | (2006.01) |
| B64C 25/32 | (2006.01) |
| B64C 25/00 | (2006.01) |

(52) U.S. Cl.
CPC .............. *B64C 25/10* (2013.01); *B64C 25/34* (2013.01); *B64C 25/36* (2013.01); *B60C 2200/02* (2013.01); *B64C 2025/008* (2013.01); *B64C 2025/325* (2013.01)

(58) Field of Classification Search
CPC ......... B64C 25/10; B64C 25/34; B64C 25/36; B64C 2025/325

See application file for complete search history.

(56) References Cited

U.S. PATENT DOCUMENTS

| | | |
|---|---|---|
| 1,049,521 A | 1/1913 | Parisano |
| 2,326,210 A | 8/1943 | Falk et al. |

(Continued)

FOREIGN PATENT DOCUMENTS

| | | |
|---|---|---|
| FR | 2372726 A1 | 6/1978 |
| GB | 524929 | 1/1939 |

OTHER PUBLICATIONS

Wikipedia, "Boeing Vertol CH-46 Sea Knight," Jun. 5, 2016 (Year: 2016).*

(Continued)

*Primary Examiner* — Assres H Woldemaryam
(74) *Attorney, Agent, or Firm* — Brooks Kushman P.C.

(57) ABSTRACT

A rotorcraft having an airframe, the airframe carrying at least one rotor that contributes to providing the rotorcraft with lift and/or propulsion, the rotorcraft having at least one undercarriage. The at least one undercarriage comprises at least one inclined wheel undercarriage, the inclined wheel undercarriage having an undercarriage leg carrying at least one axle, the at least one axle carrying at least one wheel, the at least one wheel not being in contact with any other wheel, the at least one wheel presenting positive or negative camber when the at least one wheel touches the ground and independently of forces exerted by said airframe on the inclined wheel undercarriage.

18 Claims, 3 Drawing Sheets

(56) References Cited

U.S. PATENT DOCUMENTS

| | | | | |
|---|---|---|---|---|
| 2,861,759 | A | * | 11/1958 | Wright .................. B64C 25/505 |
| | | | | 244/103 R |
| D188,146 | S | * | 6/1960 | Douglas ....................... D12/329 |
| 3,554,259 | A | | 1/1971 | Webb |
| 4,142,698 | A | | 3/1979 | Niebanck et al. |
| 5,016,838 | A | * | 5/1991 | Brooks ................... B60C 11/00 |
| | | | | 152/209.1 |
| 5,088,662 | A | | 2/1992 | Appleberry |
| 7,156,407 | B2 | * | 1/2007 | Jahn ......................... A61G 5/02 |
| | | | | 152/209.1 |

OTHER PUBLICATIONS

Wikipedia, "Camber Angle," Nov. 16, 2016, https://en.wikipedia.org/wiki/Camber_angle (Year: 2016).*
French Search Report for French Application No. FR1770743, Completed by the French Patent Office, dated Feb. 9, 2018, 6 pages.

* cited by examiner

Fig.1

ROTORCRAFT HAVING AT LEAST ONE UNDERCARRIAGE WITH AT LEAST ONE INCLINED WHEEL, AND A METHOD

CROSS-REFERENCE TO RELATED APPLICATIONS

This application claims priority to French patent application No. FR 1770743 filed on Jul. 18, 2017, the disclosure of which is incorporated in its entirety by reference herein.

BACKGROUND OF THE INVENTION

(1) Field of the Invention

The present invention relates to a rotorcraft having at least one undercarriage with at least one inclined wheel, and it also relates to a method.

2) Description of Related Art

Conventionally, a rotorcraft has one or more undercarriages via which the rotorcraft stands on the ground.

The rotorcraft may have one or more undercarriages each having at least one wheel. Each wheel may include an inflated tire. The term "wheeled undercarriage" is used herein to mean an undercarriage having at least one wheel. An undercarriage may have a single wheel, or in contrast an undercarriage may be of the twin-wheel type with two wheels arranged laterally on either side of the leg of the undercarriage.

For example, an aircraft may have a twin-wheel nose-wheel undercarriage and two single-wheel main undercarriages. The nose-wheel undercarriage and the two main wheeled undercarriages are arranged longitudinally in front of and behind the center of gravity of the aircraft. The two main wheeled undercarriages may also be of the twin-wheel type.

A wheeled undercarriage has an undercarriage leg. The undercarriage leg is secured to the airframe of the aircraft, and it is optionally hinged to the airframe so as to be hidden in flight in a wheel well. Such an undercarriage leg may be fitted with a shock absorber, and/or with a retraction actuator.

Furthermore, the undercarriage leg is secured to at least one wheel axle. The wheel is carried by the wheel axle and it is free to rotate about the axle. The wheel axle thus represents a rod enabling the wheel to be offset laterally from the undercarriage leg. The wheel axle extends at an angle relative to the undercarriage leg so that the wheel is orthogonal relative to the ground when touching the ground, i.e. before the undercarriage deforms under the effect of forces exerted on the undercarriage when on the ground.

In another aspect, a rotorcraft, and in particular a helicopter, is subjected to a phenomenon of ground resonance. The ground resonance phenomenon is mechanical instability. A rotorcraft, and in particular a helicopter, has a rotor that contributes at least in part to providing the lift of the rotorcraft. Oscillations of the blades of the rotor about their respective lead-lag axes can become coupled in unstable manner with movements, in particular in roll and in pitching of the rotorcraft fuselage depending on the resilient deformation modes of (the undercarriages and wheels). This is at the origin of the "ground resonance" phenomenon.

When the rotorcraft is standing on the ground, if the excitation frequency of the rotor is close to the resonant frequency of the fuselage on its landing gears in rolling or in pitching, then the ground resonance phenomenon can appear. These movements are rarely pure, but comprise combinations of various simple movements, e.g. rolling movements and sideways shifting movements. Below, the term "rolling" is used on its own to cover a combination of roll and shifting movements. The lead-lag movement of the blades creates an unbalance effect that subjects the rotorcraft when standing on the ground via its landing gears to excitation that generates roll and/or pitching movement of the rotorcraft. This movement tends to move the center of the rotor, thereby imparting lead-lag excitation to the blades. As the movement of the rotorcraft increases, the blades are increasingly excited in the lead-lag plane of the rotor, and so the unbalance increases. The phenomenon can then run away when in the presence of a large amount of energy, and can lead to the rotorcraft flipping over.

On a rotorcraft having wheeled undercarriages, each wheeled undercarriage may be designed to present stiffness and damping in order to contribute to avoiding the ground resonance phenomenon.

In addition to the influence of weight, inertias, and the position of the center of gravity of the aircraft, the resonant frequency of the fuselage on its landing gear, e.g. in rolling, depends on the overall stiffness of the landing gears about the roll axis. This overall stiffness depends on the lateral stiffness of the tires of the wheels of the wheeled undercarriages and on the vertical stiffnesses of the wheeled undercarriages. The term "lateral stiffness" refers below to the stiffness of the member or assembly concerned in a direction that is substantially transverse. The term "vertical stiffness" refers below to the stiffness of the member or the assembly concerned in a direction that is substantially vertical.

It is therefore desirable to cause the resonant frequencies of the fuselage on its landing gears to be remote from the excitation frequencies. Thus, by way of example, in order to cause the resonant frequency in rolling of the fuselage on its undercarriages to be greater than the excitation frequency, a manufacturer may define some minimum lateral stiffness to be achieved by the wheels and/or the tires of the wheels. If the lateral stiffness of the wheels is not sufficient, compensation may be achieved by increasing the vertical stiffness of each main undercarriage, e.g. by adapting the stiffness of a shock absorber of the main undercarriage. In contrast, the vertical stiffness of each nose undercarriage may have substantially no influence on the resonant frequency in rolling of the fuselage on its undercarriages since a nose undercarriage is not stressed vertically while the aircraft is subject to roll oscillations.

The tires of a wheeled undercarriage are dimensioned in particular as a function of the load that the wheels are to support, given the weight of the aircraft. Freedom of choice in terms of lateral stiffness is restricted. Under such circumstances, a manufacturer may tend to compensate for insufficient lateral stiffness by increasing the vertical stiffness of each main undercarriage using the above-described technique. Although it is effective, that increase can tend to minimize the comfort of the aircraft during landing or can indeed constitute a limit on optimizing that parameter.

As an alternative, or in addition, the pressure to which the tires of the wheels are inflated can be modified. Increasing the inflation pressure of the wheels nevertheless tends to give rise to large forces in the airframe of the aircraft, can lead in the long run to tire wear, and/or can reduce the ability of the aircraft to taxi on certain surfaces.

As an alternative or in addition, the number of wheels of a wheeled undercarriage can be modified. Specifically, the lateral stiffness of a twin-wheel type wheeled undercarriage tends to be greater than the lateral stiffness of a single-wheel undercarriage. A twin-wheel type wheeled undercarriage nevertheless presents considerable weight because of the presence of two wheels and two wheel axles, and it can require the use of two brakes.

Document FR 2 372 726 discloses a suspension device having connecting rods and hydraulic shock absorbers. The hardness and the damping of the suspension device are adjusted so as to be sufficiently great vertically to attenuate the forces that result from an impact against the ground, and sufficiently small in rolling to avoid instability as a result of ground resonance.

Document U.S. Pat. No. 2,861,759 is mentioned for information only since it provides no teaching about the problem of ground resonance. That Document U.S. Pat. No. 2,861,759 proposes using a twin-wheel type undercarriage. That undercarriage is provided with two wheels that are inclined so as to touch each other close to the ground between the ground and the wheel axles. The two wheels then present two respective sidewalls in contact with each other so as to reduce the vibratory phenomenon known as "shimmy".

The automotive field does not form part of the technical field of the invention. A motor car may present wheels having a particular degree of camber so that the tires present a contact surface with the ground that is optimized for turning. That technical field has no connection with aviation and provides no teaching concerning the phenomenon of ground resonance, which is specific to rotorcraft.

The term "camber" is a term taken for convenience from the automotive field. This term "camber" refers to a wheel that, when seen from in front, presents a non-zero angle between the plane in which it rotates and the vertical, in particular when the wheel is on the ground. The camber is said to be "negative" when the top of the wheel slopes towards the center of the vehicle. The camber is said to be "positive" in the opposite situation.

Documents U.S. Pat. No. 2,326,210, GB 524 929, U.S. Pat. Nos. 5,088,662, 1,049,521, and 3,554,259 are also known.

BRIEF SUMMARY OF THE INVENTION

An object of the present invention is thus to propose a rotorcraft having at least one novel wheeled undercarriage for combating the ground resonance phenomenon.

According to the invention, a rotorcraft is provided with an airframe, said airframe carrying at least one rotor that contributes to providing the rotorcraft with lift and/or propulsion, said rotorcraft having at least one undercarriage. For example the rotorcraft is a helicopter.

Furthermore, said at least one undercarriage comprises at least one inclined wheel undercarriage, said inclined wheel undercarriage having an undercarriage leg carrying at least one axle, said at least one axle carrying at least one wheel, said at least one wheel presenting non-zero camber when said at least one wheel touches the ground and independently of forces exerted by said airframe on the inclined wheel undercarriage.

The term "non-zero camber" means that the wheel in question is inclined relative to the ground, the rolling plane of that wheel not being orthogonal to the ground, on ground that is horizontal.

The non-zero camber of a wheel of an inclined wheel undercarriage enables the tire of the wheel firstly to contribute to absorbing shocks on landing, and secondly to have an influence on the resonant frequency of the airframe in rolling when standing on its undercarriages on the ground. Specifically, a tire presents radial stiffness and axial stiffness relative to the axis of rotation of the wheel, both of which stiffnesses have an influence, in proportion to their projections onto the reference frame of the aircraft, on absorbing shocks on landing and on the resonant frequency of the aircraft in rolling when standing on its undercarriages on the ground. Axial stiffness represents the stiffness of the wheel along the axis of rotation of the wheel and radial stiffness represents the stiffness of the wheel perpendicularly to said axis of rotation.

Specifically, the resultant lateral stiffness of the wheel along an axis parallel to the pitching axis of the rotorcraft is equal to the sum of the axial stiffness of the wheel multiplied by the cosine squared of the angle of inclination of the wheel plus the radial stiffness of the tire multiplied by the sine squared of the same angle of inclination. This radial stiffness terms serves to increase the lateral stiffness of the wheel compared with a conventional non-inclined wheel of an undercarriage. This increase in lateral stiffness can tend to improve the situation of the rotorcraft relative to the ground resonance phenomenon.

This teaching is not disclosed in the automotive field.

Furthermore, this angle of inclination has no impact on the weight of the aircraft, which constitutes a significant advantage.

The rotorcraft may also have one or more of the following characteristics.

Thus, said at least one wheel rotates in a rolling plane, and said rolling plane may present an angle of inclination lying in the range 65 degrees to 85 degrees relative to the ground when said at least one wheel touches the ground and independently of forces exerted by said airframe on the inclined wheel undercarriage.

This range makes it possible to obtain a significant effect on the ground resonance phenomenon, while having little influence during landing.

For example, by inclining the wheels at an angle of 12° relative to the vertical so as to reach an angle of inclination of 78 degrees relative to the ground, the lateral stiffness of the wheel may be increased by about 10%, which can serve to increase the resonant frequency in rolling of the airframe on the ground by about 5%. The vertical stiffness of the wheel is decreased by about 3%, which decrease has little influence on the performance of the rotorcraft during a landing.

In an aspect, a wheel of an inclined wheel undercarriage may be inclined by inclining the wheel relative to the axle and/or by inclining the axle appropriately relative to the ground, and/or by inclining the undercarriage leg relative to the ground.

In an aspect, for said undercarriage leg having a center of gravity that is located at a location when said at least one wheel touches the ground during a landing, for a vertical plane passing through said location and orthogonal to a pitching axis of the rotorcraft when the rotorcraft is not turning on the ground, for a first distance lying orthogonally between a top of said at least one wheel and the vertical plane, and for a second distance lying between the vertical plane and a surface of said at least one wheel in contact with the ground, said second distance may be different from said first distance.

When an inclined wheel undercarriage is inclined so that its top is closer to the undercarriage leg, the second distance is greater than the first distance.

In an aspect, said inclined wheel undercarriage may be a single wheel undercarriage. The term "said at least one wheel" then refers to one wheel only. The inclined wheel undercarriage thus has only one inclined wheel.

The invention is thus applicable to an undercarriage having only one wheel, which wheel presents non-zero camber.

Alternatively, said at least one wheel may comprise at least two wheels arranged transversely on either side of the undercarriage leg, said at least two wheels presenting non-zero camber.

By way of example, the inclined wheel undercarriage may be of the twin-wheel type.

Optionally, for a first length lying transversely between two respective tops of said at least two wheels, and for a second length lying between two respective surfaces of said at least two wheels in contact with the ground, said second length is different from said first length, said first length and said second length being non-zero.

When two wheels of an inclined wheel undercarriage are inclined so that their tops come closer to the undercarriage leg, the second length is greater than the first length.

In another aspect, said at least one wheel has an inflated tire.

In another aspect, said at least one undercarriage comprises a plurality of undercarriages, each carrying at least one wheel, with at least one and possibly all of said plurality of undercarriages being of the inclined wheel undercarriage type.

In addition to a rotorcraft, the invention provides a method of limiting the risk of the ground resonance phenomenon appearing on a rotorcraft, said rotorcraft having an airframe, said airframe carrying at least one rotor that contributes to providing the rotorcraft with lift and/or propulsion, said rotorcraft having at least one undercarriage, said undercarriage having an undercarriage leg carrying at least one axle, and said at least one axle carrying at least one wheel.

The method includes a step of inclining said at least one wheel so as to give said at least one wheel camber that is not zero when said at least one wheel touches the ground and independently of the forces exerted by said airframe on the inclined wheel undercarriage, and preventing said at least one wheel being in contact with another wheel, so that said at least one wheel presents axial stiffness and radial stiffness relative to the axis of rotation of said at least one wheel that both have an influence on absorbing energy on landing and on the positioning of the resonant frequency(ies) in rolling of the airframe on the ground.

Optionally, said at least one wheel rotates in a rolling plane, and said inclination is performed so as to provide an angle of inclination lying in the range 65 degrees to 85 degrees between the rolling plane and the ground, and correspondingly a supplementary angle lying in the range 95 degrees to 115 degrees relative to the same ground.

BRIEF DESCRIPTION OF THE DRAWINGS

The invention and its advantages appear in greater detail from the context of the following description of embodiments given by way of illustration and with reference to the accompanying figures, in which.

Elements present in more than one of the figures are given the same references in each of them.

DETAILED DESCRIPTION OF THE INVENTION

Three mutually orthogonal directions X, Y, and Z are shown in some of the figures.

The first direction X is said to be longitudinal. The term "longitudinal" relates to any direction parallel to the first direction X.

The second direction Y is said to be transverse. The term "lateral" relates to any direction parallel to the second direction Y.

Finally, the third direction Z is said to be vertical. The term "vertical" relates to any direction parallel to the third direction Z.

Figure 1:
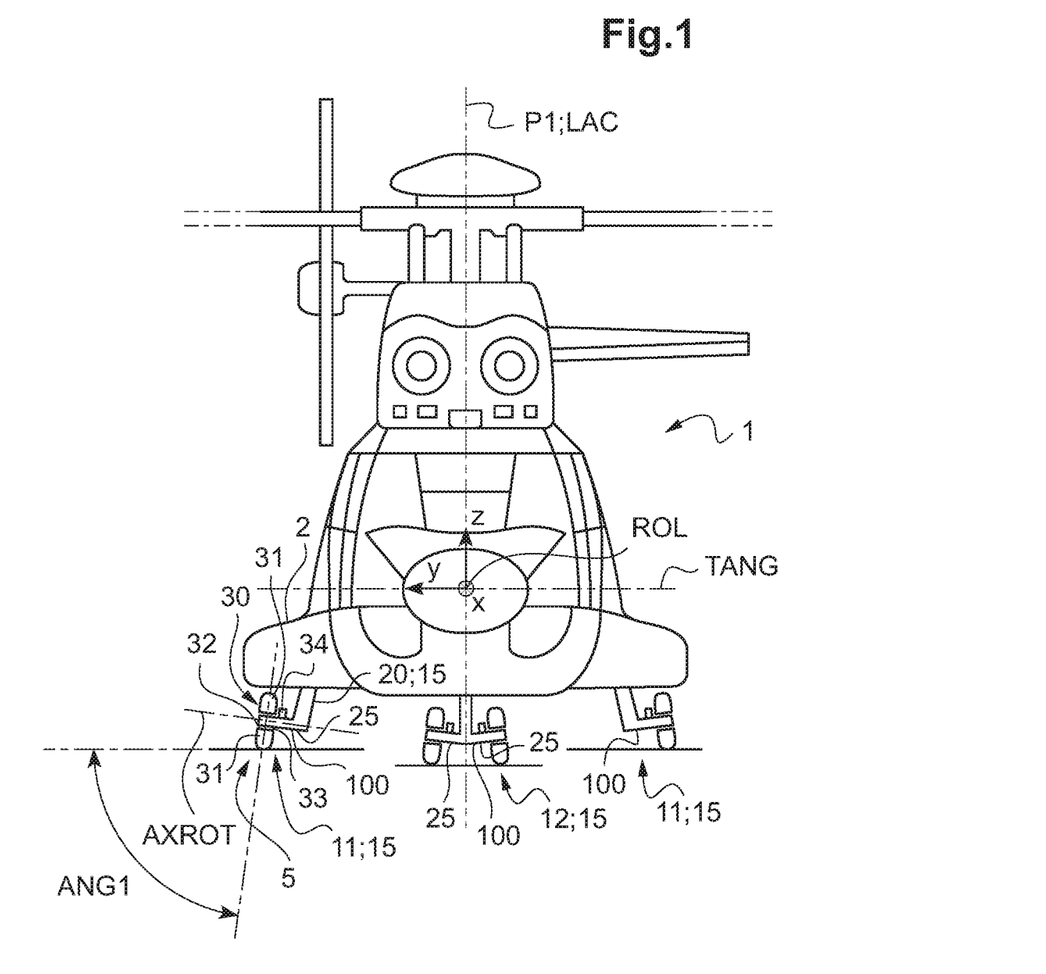
FIG. 1 is a view of an aircraft of the invention.

FIG. 1 is a view of a rotorcraft 1 of the invention. The rotorcraft 1 has an airframe 2. The airframe 2 extends vertically along a yaw axis LAC parallel to the third direction Z, from a bottom wall to a top zone. The airframe 2 extends transversely along a pitching axis TANG parallel to the second direction Y, from a left flank to a right flank. The airframe 2 extends longitudinally along a rolling axis ROL and in a vertical longitudinal plane P1 parallel to the first direction X from a nose to a tail.

The airframe 2 carries at least one rotor 5 that contributes to providing the rotorcraft with lift and/or propulsion. The rotor 5 is optionally arranged above the top zone of the airframe. For example, the rotorcraft may be a helicopter having least one main rotor. In another example, the rotorcraft is a hybrid aircraft having at least one rotor and at least one propeller.

The rotorcraft 1 is also provided with landing gear. On the ground 100, the airframe 2 is carried by the landing gear. The landing gear comprises a plurality of undercarriages 11, 12. At least one and possibly all of the undercarriages is/are provided with at least one wheel.

By way of example, the landing gear comprises two single-wheel main undercarriages 11 and one nose undercarriage 12 of twin-wheel type.

Independently of the number of wheels, at least one undercarriage 11, 12 is an inclined wheel undercarriage 15. Optionally, several or indeed all of the undercarriages 11, 12 are inclined wheel undercarriages 15.

Figure 2:
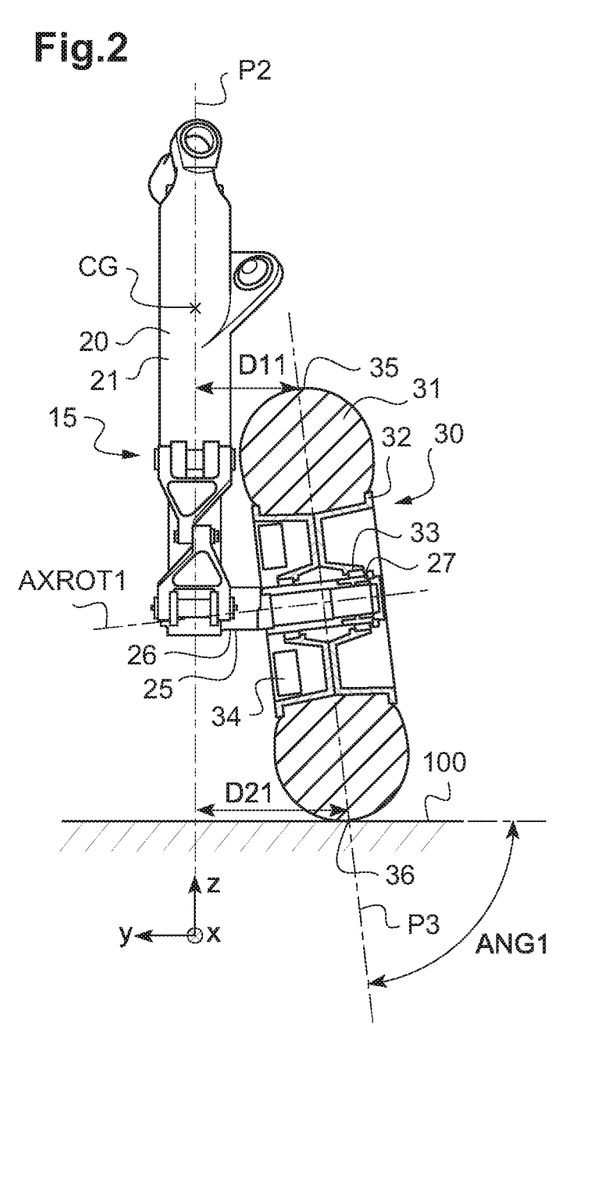
FIG. 2 is a view of a single-wheel undercarriage of the invention.

With reference to FIG. 2 and independently of the number of wheels, an inclined wheel undercarriage 15 has an undercarriage leg 20. The undercarriage leg 20 may possess a rod and/or a shock absorber 21, and/or an actuator, . . . . The undercarriage leg 20 is attached to the airframe 2. Optionally, the undercarriage leg is hinged to the airframe 2 so as to be retracted into a wheel well. The undercarriage leg may also allow the wheel(s) of the undercarriage to swivel while turning.

Furthermore, the center of gravity CG of the undercarriage leg is located in a particular position when each wheel touches the ground during a landing. A vertical plane P2 passing through this position is orthogonal to a pitching axis TANG of the rotorcraft, at least while the rotorcraft is not turning on the ground and is therefore taxiing in a straight line. The vertical plane P2 may then be parallel and/or coincide with the vertical longitudinal plane P1. The vertical plane P2 may be a plane of symmetry of the undercarriage leg.

Furthermore, an inclined wheel undercarriage 15 is provided with at least one axle 25. The axle 25 extends from a proximal zone 26 that is secured to the undercarriage leg to an end zone 27 that is free.

The axle 25 carries at least one wheel 30 on its free end zone 27. The wheel 30 presents a degree of freedom to move in rotation relative to the axle 25 about an axis of rotation AXROT1, and in a rolling plane P3. The wheel 30 may include an inflated tire 31. The tire 31 is arranged around a rim 32. The rim 32 is then arranged around the free end zone 27 with one or more rolling bearings 33 being arranged between the rim 32 and the free end zone 27.

Furthermore, the inclined wheel undercarriage 15 may include a brake 34 for braking the wheel. Other conventional members may also be provided, such as a load measuring system, for example.

In the method of the invention, an inclination step consists in inclining a wheel 30 of an inclined wheel undercarriage so as to obtain a non-zero camber that may be positive or negative, at least when the rotorcraft touches the ground.

Thus, such a wheel 30 of an inclined wheel undercarriage is an inclined wheel that presents a camber, e.g. negative camber, as observed in particular when said at least one wheel 30 touches the ground 100 and independently of forces exerted by said airframe 2 on the inclined wheel undercarriage 15, and possibly continuously. Each wheel of an inclined wheel undercarriage may present non-zero camber.

Under such circumstances, a top 35 of an inclined wheel 30 of an inclined wheel undercarriage is closer to or further away from the vertical plane P2 than is the bottom surface 36 of the wheel, depending on its camber.

The term "top" when associated with a wheel 30 designates the highest point of the wheel 30 at a given instant situated above the axle 25 and with reference to a direction going from one end of the undercarriage leg connected to the airframe 2 towards the axle 25. Conversely, the term "surface" designates the point(s) of the wheel 30 furthest away from the axle and situated under the axle with respect to said direction.

A first distance D11 lies orthogonally between the top 35 and the vertical plane P2, a second distance D21 lies orthogonally between the vertical plane P2 and the surface 36, with the second distance D21 then being different from the first distance D11.

In FIG. 2, the second distance D21 is greater than the first distance D11 so that the top 35 is closer to the undercarriage leg. Alternatively, and depending on requirements, the second distance D21 may be less than the first distance D11.

In an aspect, and because of the non-zero camber, the rolling plane P3 of the wheel 30 may present an angle lying in the range 5 degrees to 25 degrees relative to the vertical, i.e. an angle of inclination ANG1 lying in the range 65 degrees to 85 degrees relative to horizontal ground. The term "vertical" designates an axis perpendicular to the ground.

In order to incline the wheel 30 in the required manner, the axle 25 carrying the wheel 30 may present an angle of inclination relative to the undercarriage leg. For example, the vertical plane P2 containing the undercarriage leg may be orthogonal to the ground 100, with the axle extending so that the axis of rotation of the wheel presents an angle that is not a right angle with the vertical plane P2. Alternatively, an axle 25 may present a right angle relative to the undercarriage leg 20, the wheel 30 being orthogonal to the axle, the undercarriage leg 20 then presenting an angle relative to the ground that is not a right angle. Other embodiments can be envisaged in order to obtain a wheel that is inclined.

In another aspect, FIG. 2 shows an inclined wheel undercarriage 15 of the single wheel type. The inclined wheel undercarriage 15 then has a single axle that carries a single wheel, the wheel presenting the desired negative camber.

Figure 3:
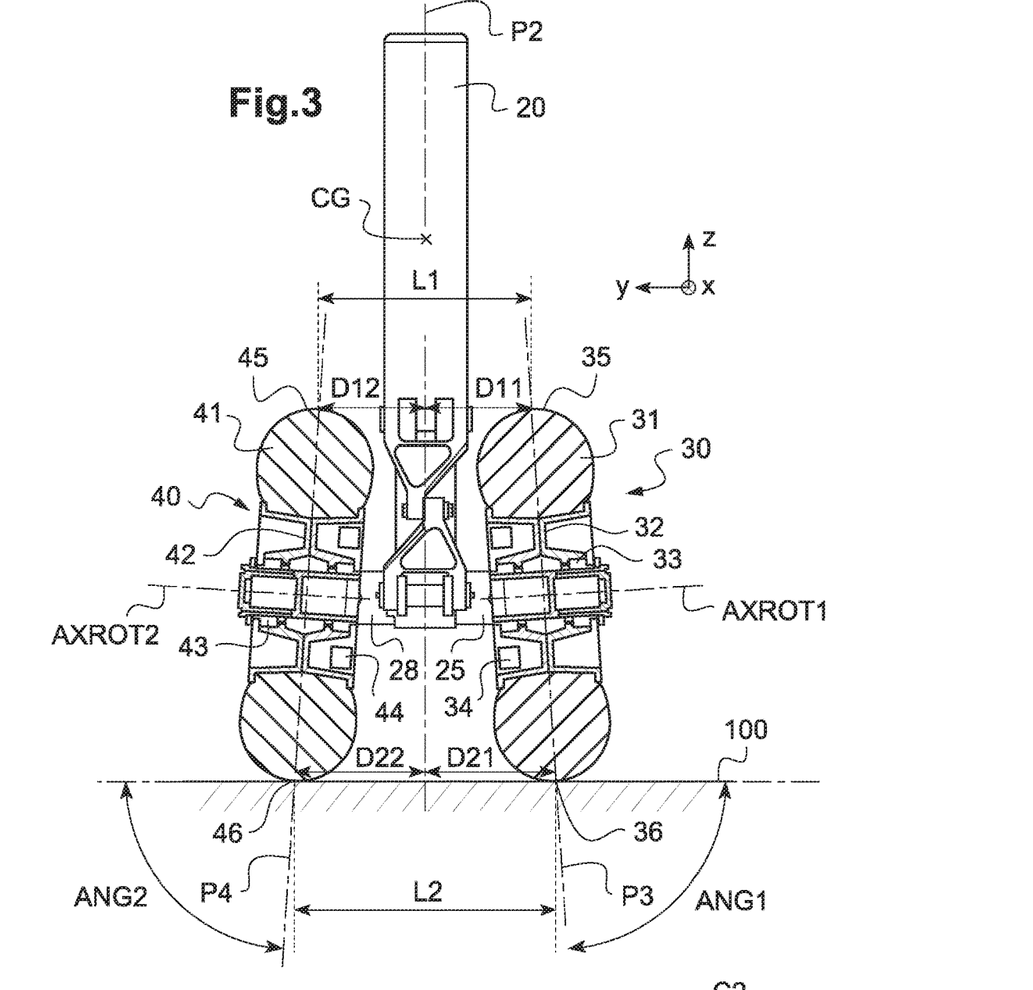
FIG. 3 is a view of a twin-wheel type undercarriage of the invention.

In FIG. 3, an inclined wheel undercarriage 15 may have at least two wheels 30, 40 arranged transversely on either side of the undercarriage leg 20, each of said at least two wheels 30, 40 presenting a non-zero camber.

The inclined wheel undercarriage 15 may in particular be a twin-wheel type undercarriage. The inclined wheel undercarriage 15 has an undercarriage leg 20 that carries two axles 25 and 28. The axles 25, 28 extend transversely from the undercarriage leg 20 in two respective opposite directions. Each axle may present an angle relative to the undercarriage leg that is not a right angle.

In their free end zones 27, the two axles 25 and 28 carry at least two inclined wheels 30 and 40. Each wheel 30, 40 presents a degree of freedom to move in rotation relative to the corresponding axle 25, 28 about an axis of rotation AXROT1, AXROT2 and to do so in a respective rolling plane P3, P4. Under such circumstances, each wheel 30, 40 may include an inflated tire 31, 41. Each tire 31, 41 is arranged around a rim 32, 42. Each rim 32, 42 is arranged around the corresponding free end zone with one or more rolling bearings 33, 43 arranged between each rim 32, 42 and the corresponding free end zone.

Furthermore, the undercarriage may include a brake 34, 44 for each wheel. Other conventional members may be provided, such as a load measuring system, for example.

The rolling plane of each wheel of the undercarriage may present an angle of inclination ANG1, ANG2 that lies in the range 65 degrees to 85 degrees with horizontal ground.

Optionally, a first length L1 lies transversely between the two tops 35, 45 respectively of said at least two wheels 30, 40, and a second length L2 lies between two respective surfaces 36, 46 of said at least two wheels 30, 40 in contact with the ground 100, with the second length L2 being different from the first length L1, the first length L1 and the second length L2 being non-zero.

In FIG. 3, the second length L2 is greater than the first length L1. As an alternative, and depending on requirements, the second length L2 could be less than the first length L1.

Furthermore, and as shown, said at least two wheels 30, 40 do not touch each other.

Figure 4:
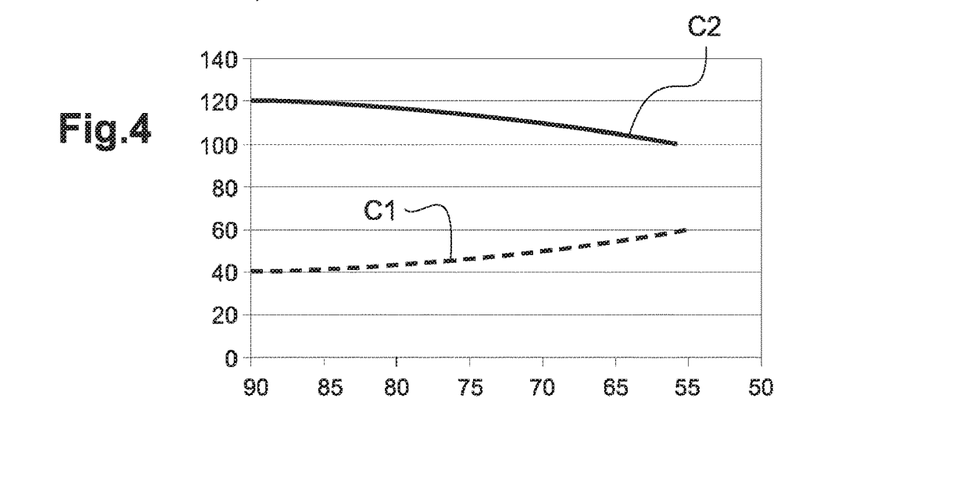
FIG. 4 is a plot explaining the method of the invention.

FIG. 4 illustrates the advantage of the invention. FIG. 4 is a plot, with the angle of inclination of a wheel relative to the ground plotted along the abscissa axis and with the stiffnesses of the wheel plotted up the ordinate axis. Curve C1 shows the lateral stiffness of the wheel, i.e. stiffness parallel to the pitching axis. Curve C2 shows the vertical stiffness of the wheel, i.e. parallel to the yaw axis.

By inclining a wheel of an inclined wheel undercarriage, the invention makes it possible to increase lateral stiffness, while having relatively little impact on vertical stiffness. By way of illustration, with an angle of 12° relative to the vertical and thus with an angle of inclination of 78° relative to the ground, the lateral stiffness of the inclined wheel may increase by about 10%, while the vertical stiffness of the inclined wheel decreases by about 3%.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A rotorcraft having an airframe having a front and a rear, the airframe carrying at least one rotor that contributes to providing the rotorcraft with lift and/or propulsion, the rotorcraft having at least one undercarriage towards the front of the airframe, wherein the at least one undercarriage comprises at least one inclined wheel undercarriage, the inclined wheel undercarriage having an undercarriage leg carrying at least one axle, the at least one axle carrying at least two wheels, the undercarriage leg having a center of gravity that is located at a location when the at least two wheels touch the ground during a landing, a vertical plane passing through the location and orthogonal to a pitching axis of the rotorcraft when the rotorcraft is not turning on the ground, the at least two wheels not being in contact with any other wheel, the at least two wheels presenting non-zero camber when the at least two wheels touch the ground and independently of forces exerted by the airframe on the inclined wheel undercarriage, the at least two wheels having a negative camber and being arranged transversely on either side of the undercarriage leg and wherein for each wheel a first distance lies orthogonally between a top of the wheel and the vertical plane and a second distance lies between the vertical plane and a surface of the wheel in contact with the ground, the second distance being greater than the first distance.

2. The rotorcraft according to claim 1, wherein each of the at least two wheels rotates in a rolling plane, and the rolling plane presents an angle of inclination lying in the range 65 degrees to 85 degrees relative to the ground when each of the at least two wheels touches the ground and independently of forces exerted by the airframe on the inclined wheel undercarriage.

3. The rotorcraft according to claim 1, wherein, for a first length lying transversely between two respective tops of the at least two wheels, and for a second length lying between two respective surfaces of the at least two wheels in contact with the ground, the second length is different from the first length, the first length and the second length being non-zero.

4. The rotorcraft according to claim 3, wherein the second length is greater than the first length.

5. The rotorcraft according to claim 1, wherein each of the at least two wheels has an inflated tire.

6. The rotorcraft according to claim 1, wherein the at least one undercarriage comprises a plurality of undercarriages, at least one of the plurality of undercarriages including at least one inclined wheel undercarriage.

7. A rotorcraft comprising:

an airframe having a front and a rear and carrying at least one rotor that contributes to providing the rotorcraft with lift and/or propulsion;

an undercarriage towards the front of the airframe and comprising at least one inclined wheel undercarriage, the inclined wheel undercarriage having an undercarriage leg carrying at least one axle, the at least one axle carrying at least two wheels, the undercarriage leg having a center of gravity that is located at a location when the at least two wheels touch the ground during a landing, a vertical plane passing through the location and orthogonal to a pitching axis of the rotorcraft when the rotorcraft is not turning on the ground, the at least two wheels not being in contact with any other wheel, the two wheels presenting non-zero camber when the at least two wheels touch the ground and independently of forces exerted by the airframe on the inclined wheel undercarriage, the at least two wheels angled inwardly from top to bottom of the wheel, the at least two wheels comprising a first wheel and a second wheel, the first wheel is arranged on a first side of the undercarriage leg and the second wheel is arranged transverse to the first wheel on a second side of the undercarriage leg such that for each wheel a first distance lies orthogonally between the top of the wheel and the vertical plane and a second distance lies between the vertical plane and the bottom of the wheel in contact with the ground, the second distance being greater than the first distance.

8. The rotorcraft according to claim 7, wherein each of the at least two wheels rotates in a rolling plane, and the rolling plane presents an angle of inclination lying in the range 65 degrees to 85 degrees relative to the ground when each of the at least two wheels touches the ground and independently of forces exerted by the airframe on the inclined wheel undercarriage.

9. The rotorcraft according to claim 7, wherein, for a first length lying transversely between two respective tops of the at least two wheels, and for a second length lying between two respective surfaces of the at least two wheels in contact with the ground, the second length is different from the first length, the first length and the second length being non-zero.

10. The rotorcraft according to claim 9, wherein the second length is greater than the first length.

11. The rotorcraft according to claim 7, wherein each of the at least two wheels has an inflated tire.

12. The rotorcraft according to claim 7, wherein the at least one undercarriage comprises a plurality of undercarriages, with each of the plurality of undercarriages including at least one inclined wheel undercarriage.

13. A rotorcraft comprising:

an airframe having a front and a rear;

a rotor supported by the airframe, the rotor contributing to providing the rotorcraft with lift and/or propulsion;

an inclined wheel undercarriage supported by the airframe and disposed towards the front of the airframe, the inclined wheel undercarriage having an undercarriage leg and at least two wheels connected transversely to the undercarriage leg on either side of the undercarriage leg, the undercarriage leg having a center of gravity located at a location when the at least two wheels touch the ground during a landing, a vertical plane passing through the location and orthogonal to a pitching axis of the rotorcraft when the rotorcraft is not turning on the ground, the at least two wheels negatively cambered and having a top and a surface in contact with the ground, the at least two wheels not being in contact with each other, wherein for each wheel a first distance lies orthogonally between the top of the wheel and the vertical plane and a second distance lies between the vertical plane and a mid-point of the surface of the wheel in contact with the ground, the second distance being greater than the first distance.

14. The rotorcraft according to claim 13, wherein each of the at least two wheels rotates in a rolling plane, and the rolling plane presents an angle of inclination lying in the range 65 degrees to 85 degrees relative to the ground when each of the at least two wheels touches the ground and independently of forces exerted by the airframe on the inclined wheel undercarriage.

15. The rotorcraft according to claim 13, wherein, for a first length lying transversely between two respective tops of the at least two wheels, and for a second length lying between two respective surfaces of the at least two wheels in contact with the ground, the second length is different from the first length, the first length and the second length being non-zero.

16. The rotorcraft according to claim 15, wherein the second length is greater than the first length.

17. The rotorcraft according to claim 13, wherein each of the at least two wheels has an inflated tire.

18. The rotorcraft according to claim 1, wherein the at least one undercarriage comprises a plurality of undercarriages, with each of the plurality of undercarriages including at least one inclined wheel undercarriage.

* * * * *